United States Patent [19]
Okada et al.

[11] 3,841,352
[45] Oct. 15, 1974

[54] COMPOUND ASEPTIC VALVE

[75] Inventors: Katsuto Okada; Shoichi Yamanami; Akichika Ishibashi; Hirotaka Watanabe, all of Tokyo, Japan

[73] Assignee: Morinaga Milk Industry Co., Ltd., Tokyo, Japan

[22] Filed: July 23, 1973

[21] Appl. No.: 381,777

[30] Foreign Application Priority Data
Aug. 3, 1972  Japan.................................. 47-91544

[52] U.S. Cl. ............................ 137/614.19, 251/211
[51] Int. Cl. ............................................. F16k 11/00
[58] Field of Search ........ 251/210, 211; 137/614.13, 137/614.14, 614.18, 614.19

[56] References Cited
UNITED STATES PATENTS
| | | | |
|---|---|---|---|
| 3,344,807 | 10/1967 | Lehrer et al. ............... | 137/614.19 X |
| 3,587,634 | 6/1971 | Krause ....................... | 137/614.19 X |

*Primary Examiner*—Henry T. Klinksiek
*Attorney, Agent, or Firm*—Kurt Kelman

[57] ABSTRACT

A compound aseptic valve is provided which prevents the passage of fluid doubly. More particularly, the valve is highly aseptic and capable of providing a double sealing and it is thus well suited for use in manufacturing and processing machinery or plants where food or beverage products are handled. The valve comprises a first valve seal, a second auxiliary valve seal mounted on a valve shaft for actuating the first valve seal, a second driving source provided independently of a driving source for actuating the valve shaft and adapted to move the second auxiliary valve seal on the valve shaft in a direction which closes the valve, a valve seat for each of the first and second valve seals to come into contact therewith, the valve seats being located in the same valve body to provide a double sealing, and a bellows for sealing within the valve body that portion of the valve shaft which is moved in and out of the valve body.

5 Claims, 1 Drawing Figure

PATENTED OCT 15 1974
3,841,352
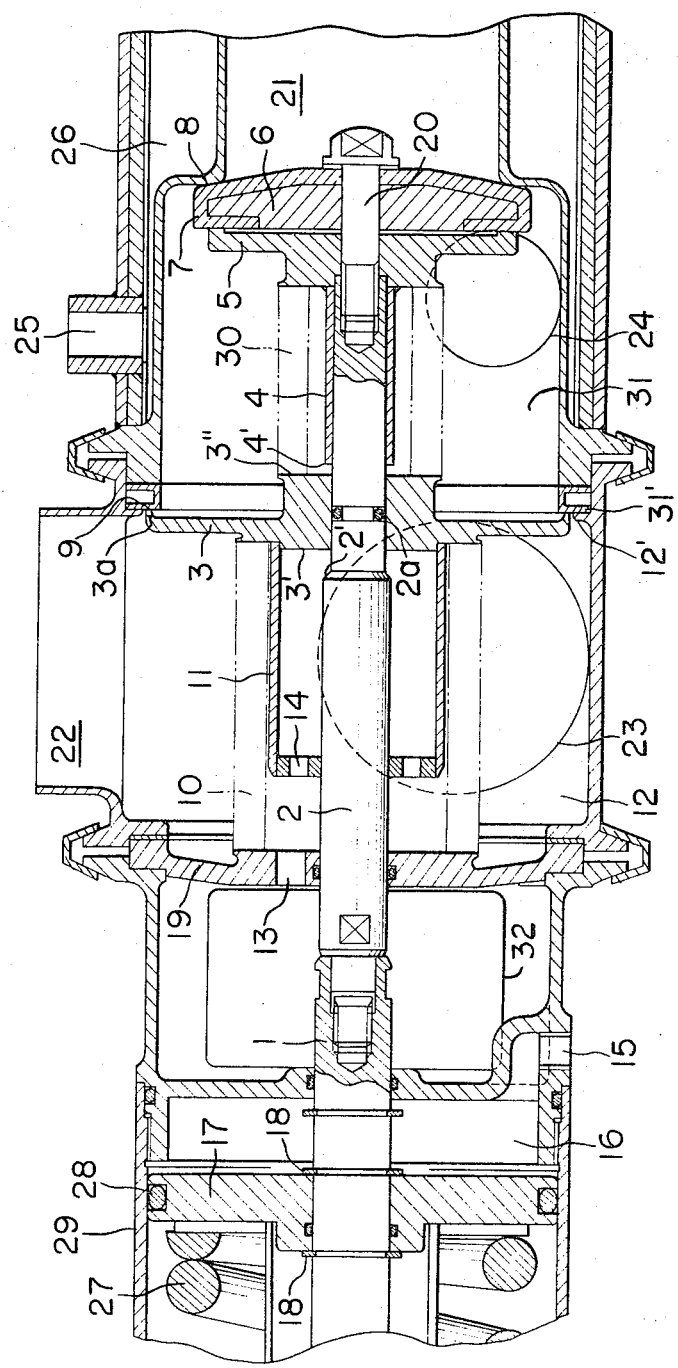

COMPOUND ASEPTIC VALVE

BACKGROUND OF THE INVENTION

The present invention relates to valves for blocking the passage of fluid. More particularly, the present invention relates to a compound aseptic valve which is well suited for use in manufacturing machinery or plants where food products, particularly milk is handled.

In a plant where milk is processed, frequency cleaning in place of the pipe line system for delivering milk is required. In such cleaning of the pipe line system in place, the pipe line system must be, without exception, sealed completely from the milk storage tank. Otherwise, there is the danger of an undesirable cleaning liquid leaking into and contaminating the food product, i.e., milk and thus causing a loss when a large quantity of milk must be discarded.

Heretofore, it has been customary to use a single valve at a point of connection between the pipe line system and the storage tank and generally satisfactory results have been obtained with such a single valve. If, however, such extraneous substances as included in the raw material milk in a considerable amount attach to the valve seal or the valve seat, or if there is any defect in the valve seal or the valve seat, the valve cannot close completely thus failing to provide a satisfactory seal.

Further, in a plant handling milk, it is preferable that not only the air and the machine oil, etc. should be prevented from entering into the pipe line system, but also the milk in the pipe line system should not be allowed to leak past the valve. Otherwise, there is the danger of any pathogenic microorganisms breeding on the leaked milk and eventually penetrating into the system.

Therefore, the valve used in such plants must provide a highly reliable leakproof joint between the outside and the space it closes. In practice, however, such a valve has a valve shaft which is reciprocated in and out of the system to actuate the valve seal and it is not an easy matter to hermetically seal that portion of the valve shaft which reciprocates to move in and out of the system.

In the past, a diaphragm type valve, for example, has been used to prevent contamination of the milk in the pipe line system. A disadvantage of the diaphragm type valve is that the diaphragm valve is subjected to a temperature as high as 130°C which is necessary for sterilizing milk and it is also exposed to acid or alkali solution used for cleaning purposes. Therefore, even if a neoprene diaphragm is used, it tends to be destroyed in a week or two.

The present invention thus relates to a compound aseptic valve in which, with a view to solving the problem of inadequate blocking of the passage of fluid and completely sealing that portion of the valve shaft exposed to the outside in the conventional valves, that portion of a valve shaft which moves in and out of a valve body is enclosed with a bellows and a portion of the bellows is used to actuate a second valve on the valve shaft for a first valve independently of the first valve.

SUMMARY OF THE INVENTION

It is an object of the present invention to provide a compound aseptic valve for providing a double sealing which comprises a first valve for providing an ordinary seal, and a second auxiliary valve actuated on the valve shaft for the first valve by supplying into or discharging air from a bellows enclosing that portion of the valve shaft which is moved in and out of a valve body.

It is another object of the present invention to provide a compound aseptic valve which comprises a single valve shaft and wherein a second auxiliary valve mounted on the valve shaft is directly and independently actuated by a bellows to provide a second seal.

It is still another object of the present invention to provide a compound aseptic valve of a construction which is simple and well suited for cleaning in place.

It is still another object of the present invention to provide a compound aseptic valve wherein the contact area between the valve seal of a second auxiliary valve actuated by a bellows and the associated valve seat is small as compared with the similar contact area of a first valve, whereby the compound aseptic valve provides a satisfactory sealing with a low urging force.

Other objects and advantages of the present invention will become readily apparent from considering the following detailed description in conjunction with the accompanying drawings.

BRIEF DESCRIPTION OF THE DRAWING

The single drawing FIGURE is a sectional view showing the double sealing structure and the double driving structure of a compound aseptic valve according to an embodiment of the present invention.

DESCRIPTION OF THE PREFERRED EMBODIMENT

In the illustrated preferred embodiment, the present invention is incorporated in a valve system in which a raw material such as milk is delivered from a port 21 connected to a storage tank in a path through a valve housing 31, 12 to an exit port 23 connected to a milk supply line system, or alternately milk is supplied from an inlet port 22 into the storage tank through the port 21. On the left side in the drawing, there is shown an air cylinder 16 enclosing a spring 27 for actuating valve shaft members 1 and 2.

A piston 17 is mounted on the valve shaft member 1 in the air cylinder 16 and it is also secured on the valve shaft member 1 by left and right snap rings 18 so that the movement of the piston 17 causes the valve shaft member 1 to move rectilinearly to the right or left. The piston 17 is provided with an O-ring placed in its circumferential groove 28 and it is disposed in sliding contact with a wall 29 of the air cylinder 16. The valve shaft member 1 is threadedly connected at one end thereof to the valve shaft member 2 which is formed with an abutment step 2' at the intermediary portion thereof. A bellows guide 5 is mounted on the valve shaft member 2 at one end thereof and a first valve seal 6 having a coating 7 made of Teflon or the like is placed at one end of the bellows guide 5 and the valve seal 6 is fixedly connected with the valve shaft member 2 by a locking bolt 20. A sleeve 4 is mounted on the valve shaft member 2 at one end portion thereof, and the left end face of the sleeve 4 forms an abutment 4' on the valve shaft member 2. A second valve seal 3 is mounted on the valve shaft member 2 between the abutments 2' and 4' with some clearance on both sides thereof, that is, a clearance between its face 3' and the abutment 2' and between its face 3'' and the stepped portion 4', respectively. The valve shaft member 2 is provided with an O-ring in a circumferential groove 2a at that portion thereof where the second valve seal 3 is mounted and the second valve seal 3 is axially slidable between the abutments 2' and 4' on the valve shaft member 2. The right end circumferential edge of the sleeve 4 is secured to the bellows guide 5 by welding, for example. A bellows 30 is secured to the valve seal 3 and the bellows guide 5 at ends thereof. The bellows 30 completely prevents contamination of the fluid in the valve body portion 31 by the valve shaft member 2 which is moved beyond the O-ring 2a that prevents leakage of the compressed air supplied into a bellows 10 from the clearance between the valve seal 3 and the valve shaft member 2.

A cover plate 19 having a through hole 13 and located at the other end of the valve shaft member 2 is connected to the valve body at the inner recessed portion of its left cylindrical side wall flange portion through a Teflon packing. The left flange of the valve body is also connected with the flange of the air cylinder 16 by a ring clip. The cover plate 19 of the valve body is also provided with an O-ring placed in the inner wall groove of its central opening so that the valve shaft member 2 is slidably movable in this central opening. One end of the bellows 10 is secured by welding, for example, to the cover plate 19 at the outer periphery of the through hole 13 and the other end of the bellows 10 is also secured by welding, for example, to the surface of the second valve seal 3. The bellows 10 encloses and seals that portion of the valve shaft member 2 which is moved in and out of the valve body through the cover plate 19. A cylindrical bellows guide 11 is disposed on the inside of the bellows 10 to prevent vibration of the bellows 10 due to changes in the pressure of fluid or pulsation of the fluid. The bellows guide 11 is provided with a hole 14 for receiving a portion of the compressed air supplied through the through hole 13 of the cover plate 19.

The valve body comprises two portions, i.e., the first valve body portion 31 and a second valve body portion 12. The second valve body portion 12 is provided with a stepped portion 12' at its right end edge and the first valve body portion 31 is fitted on the stepped portion 12' through a packing 31' made of Teflon, for example. The adjoining flanges of the first and second valve body portions are also connected together by a ring clip. The packing 31' also provides a second valve seat 9 which comes into or out of engagement with a valve face 3a of the second valve seal 3. The contact area between the valve face 3a and the valve seat 9 should preferably be as small as possible to reduce the force required for their engagement and disengagement, respectively.

The operation of the illustrated device is as follows. When it is desired to open the first and second valves so that fluid is supplied from the inlet port 22 into the tank through the port 21 or the fluid is directed to the exit port 23 through the port 21, compressed air is supplied into the air cylinder 16 through a ventilating hole 15. This causes the piston 17 to move to the left against the force of the spring 27 and consequently the valve shaft members 1 and 2 also move along with the piston 17 by virtue of the snap rings 18. In other words, the valve shaft member 1 and the valve shaft member 2 fixedly connected therewith are simultaneously actuated with the result that the valve seal 6 and its seating 7 are separated from the valve seat 8 to open the first valve. About that time, the compressed air previously supplied into the bellows 10 is exhausted through hole 13 and exhaust port 32 in the wall of cylinder 16. As the valve shaft member 2 is moved to the left, the left end of the sleeve 4 abuttingly engages the right side of the second valve seal 3 so that the second valve is opened slightly later than the opening of the first valve. Thereafter, the valve shaft member 2 is moved a predetermined distance along with the second valve seal 3. When the two valves are opened in this manner, the fluid supplied from the tank, for example, flows into the first valve body portion 31 through the port 21 and this fluid thus flows into the exit port 23 through the valve housing around the periphery of the second valve seal 3 which has already moved to provide a sufficient cross-sectional area for the passage of the fluid. In this way, the opening of the first and second valves is accomplished by the same driving source.

On the other hand, when the two valves are to be closed, the air is exhausted from the air cylinder 16 to expand the spring 27. This causes the piston 17 to move to the right so that the valve shaft members 1 and 2 are moved to the right and consequently the seal rubber 7 of the valve seal 6 attached to the end of the valve shaft member 2 comes into contact with the valve seat 8 to close the first valve. Thereafter, compressed air is supplied into the bellows 10 through the through hole 13 in the cover plate 19 of the valve body. A portion of the compressed air supplied through the through hole 13 is forced into the bellows guide 11 through the hole 14 and against the valve seal 3. As the bellows 10 is expanded, the second valve seal 3 secured to the right end of the bellows 10 is moved to the right, thereby closing the second valve. Thus, by closing the first valve first, the pressure of the fluid on the port 21 side is shut off thus making the closing of the second valve easier.

Further, since some clearance is provided between the second valve seal 3 and the abutment 2' of the valve shaft member 2, even when foreign matter is interposed between the second valve seat 9 and the valve seal 3 causing the latter to lift, the valve shaft member 2 is not caused to lift along with the second valve seal 3 and thus the first valve remains in the closed position. Further, since there is some clearance between the second valve seal 3 and the sleeve 4, when foreign matter enters between the first valve seat 8 and the valve seal 6 causing the valve shaft member 2 to lift, the second valve can still be closed.

It will thus be seen from the foregoing description that in the valve according to the present invention, each of the first and second valves is actuated by its own driving source and therefore it can safely be said that there is almost no possibility of the two valves breaking down simultaneously. Further, even there is any foreign matter in one of the sealing systems, the other sealing system can still be closed positively.

In cleaning the pipe line system upon completion of the operation, the first and second valves are closed to provide a space with both the inlet and outlet sides for fluid being sealed. Thereafter, the fluid with the system is exhausted through the exit port 23. Then, a cleaning liquid is supplied into the exit port 23 from the port 22 to clean the pipes outside the tank. Since a double sealing is provided on the storage tank side, even if there is a fault in one of the valves causing it to close incompletely, the cleaning liquid is prevented from leaking into the storage tank. Further, since the first valve body portion 31 is not cleaned during the above-mentioned cleaning of the pipe lines, in order for example to prevent the turning of milk due to rise in the temperature thereof, a coolant may be continuously supplied from an opening 25 into a sleeve 26 in the same manner as the cooling of the tank to thereby cool and preserve the milk. The cleaning of the valve body portion 31 is effected simultaneously with the cleaning of the tank.

Furthermore, a valve 24 exclusively used for draining purposes may be provided between the first valve sealing system (7, 8) and the second valve sealing system (3a, 9) so that this drain valve may be suitably opened to examine the remaining fluid therein. In this case, if there is any cleaning liquid present in the fluid, it indicates that there is leakage at the second valve sealing system, whereas if the presence of milk or the like is detected after the fluid between the first and second valve sealing systems has been discharged, it indicates that there is leakage at the first valve sealing system.

It will thus be seen from the foregoing description that the present invention provides a double sealing valve assembly wherein the closing of two valves is effected by means of separate driving sources, while the opening of the two valves is effected by the same driving source. In this way, not only when there is any foreign matter in one of the valves, but also when there is a fault in one of the valves, the passage of fluid can nevertheless be prevented safely and positively.

We claim:
1. A compound valve comprising:
   a. a valve housing formed with two ports spaced from each other and defining a path through said housing between said ports;
   b. a first valve seat and a second valve seat spaced in said body along said path;
   c. an elongated shaft mounted in said valve housing;
   d. first actuating means for longitudinally moving said shaft;
   e. first and second valve members mounted on said shaft,
      1. said first valve member sealingly engaging said first valve seat in response to movement of said shaft in one direction by said actuating means, and thereby blocking said path between said ports,
      2. said first valve member being released from said first valve seat in response to subsequent movement of said shaft in a direction opposite to said one direction by said actuating means; and
   f. second actuating means for moving said second valve member relative to said shaft in the direction of elongation of said shaft toward and away from a position of sealing engagement of said second valve member with said second valve seat,
      1. said valve member is said position thereof blocking said path,
      2. said second actuating means including bellows interposed between said housing and said second valve member in the direction of elongation of said shaft,
      3. said bellows enclosing a longitudinal portion of said shaft.

2. A valve as set forth in claim 1, further comprising two abutments longitudinally spaced on said shaft, said second valve member being inerposed between said abutments for motion transmitting engagement by one of said abutments when said shaft moves in said one direction, said one abutment constituting an element of said second actuating means.

3. A valve as set forth in claim 1, further comprising a guide sleeve secured to said second valve member for movement therewith, said guide sleeve being enclosed in said bellows and having a guide face extending in the direction of elongation of said shaft and backing said bellows.

4. A valve as set forth in claim 3, further comprising additional bellows fastened to said first and second valve members and enveloping the portion of said shaft between said valve members.

5. A valve as set forth in claim 1, wherein said first valve member engages said first valve seat in a first contact area when said first valve member blocks said path, and said second valve member engages said second valve seat in said position of said second valve member in a second contact area, said first contact area being greater than said second contact area.

* * * * *